(12) United States Patent
Varela

(10) Patent No.: US 11,001,140 B1
(45) Date of Patent: May 11, 2021

(54) AXLE ASSEMBLY HAVING A ROTOR BEARING ASSEMBLY

(71) Applicant: ArvinMeritor Technology, LLC, Troy, MI (US)

(72) Inventor: Tomaz Varela, Shelby Township, MI (US)

(73) Assignee: ArvinMeritor Technology, LLC, Troy, MI (US)

(*) Notice: Subject to any disclaimer, the term of this patent is extended or adjusted under 35 U.S.C. 154(b) by 0 days.

(21) Appl. No.: 16/733,070

(22) Filed: Jan. 2, 2020

(51) Int. Cl.
*B60K 17/16* (2006.01)
*F16H 48/06* (2006.01)
*B60B 35/12* (2006.01)
*B60K 1/00* (2006.01)
*B60K 7/00* (2006.01)
*B60K 17/354* (2006.01)
*F16H 48/14* (2006.01)
*F16H 48/42* (2012.01)

(52) U.S. Cl.
CPC ............ *B60K 17/16* (2013.01); *B60B 35/125* (2013.01); *F16H 48/06* (2013.01); *B60K 17/354* (2013.01); *B60K 2001/001* (2013.01); *B60K 2007/0046* (2013.01); *B60K 2007/0069* (2013.01); *F16H 48/142* (2013.01); *F16H 2048/423* (2013.01)

(58) Field of Classification Search
CPC .......... F16H 48/06; F16H 48/08; F16H 48/42; F16H 2048/423; B60K 17/16; B60K 2001/001; B60K 2007/0069; B60K 2007/0046; B60K 17/354; B60B 35/125

USPC ............ 475/5, 150, 220, 221, 230, 198, 204
See application file for complete search history.

(56) References Cited

U.S. PATENT DOCUMENTS

| | | | | |
|---|---|---|---|---|
| 6,592,486 | B1* | 7/2003 | Arbanas | B60K 7/0007 475/84 |
| 6,755,762 | B2* | 6/2004 | Gradu | B60K 17/35 475/150 |
| 8,808,128 | B2* | 8/2014 | Sada | F16H 3/727 475/151 |
| 2005/0187058 | A1* | 8/2005 | Teraoka | B60K 23/0808 475/5 |
| 2011/0300983 | A1* | 12/2011 | Kurokawa | B60K 6/365 475/5 |
| 2014/0349802 | A1* | 11/2014 | Steiner | F16C 35/067 475/150 |
| 2015/0330492 | A1* | 11/2015 | Lee | F16H 37/0813 475/150 |
| 2019/0054816 | A1 | 2/2019 | Garcia et al. | |
| 2019/0054817 | A1 | 2/2019 | Garcia et al. | |
| 2019/0054818 | A1 | 2/2019 | Garcia et al. | |

OTHER PUBLICATIONS

Dhanapal, et al., U.S. Appl. No. 16/205,586, filed Nov. 30, 2018.
Smith, et al., U.S. Appl. No. 16/205,623, filed Nov. 30, 2018.
Smith, et al., U.S. Appl. No. 16/206,182, filed Nov. 30, 2018.
(Continued)

*Primary Examiner* — Roger L Pang
(74) *Attorney, Agent, or Firm* — Brooks Kushman PC

(57) ABSTRACT

An axle assembly having an electric motor module, a drive pinion, and at least one rotor bearing assembly. The electric motor module may have a rotor. The rotor and the drive pinion may be rotatable about a first axis. The first rotor bearing assembly may extend between the drive pinion and the rotor.

20 Claims, 5 Drawing Sheets

(56) References Cited

OTHER PUBLICATIONS

Soffner, et al., U.S. Appl. No. 16/205,663, filed Nov. 30, 2018.
Begov et al., U.S. Appl. No. 16/205,717, filed Nov. 30, 2018.
Smith, et al., U.S. Appl. No. 16/205,771, filed Nov. 30, 2018.
Peng, et al., U.S. Appl. No. 16/205,850, filed Nov. 30, 2018.

* cited by examiner

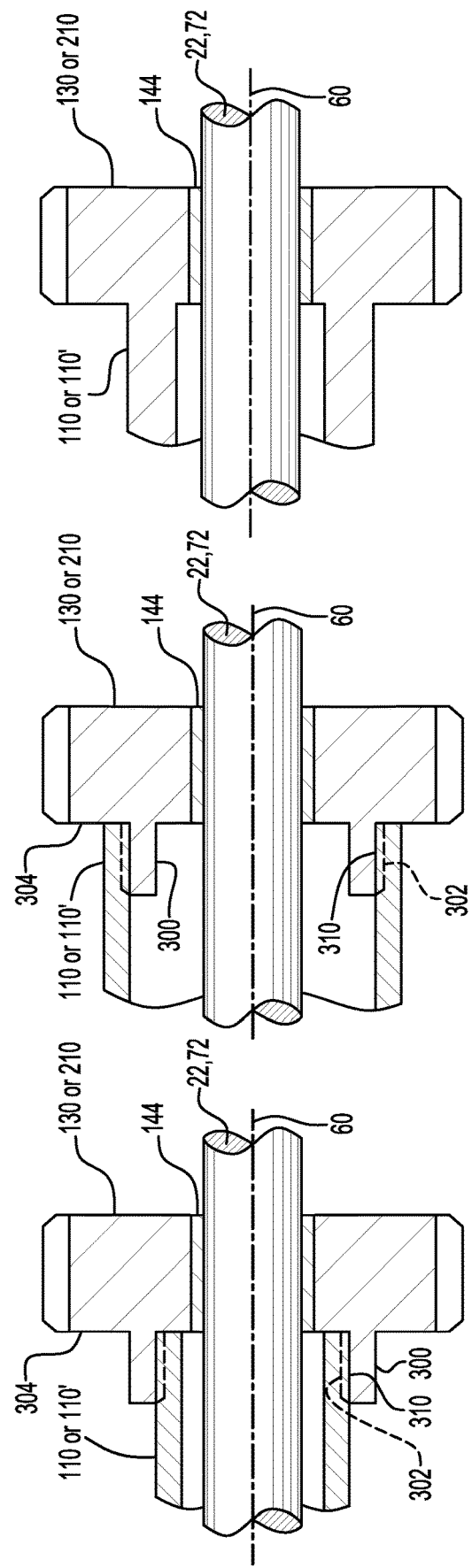

AXLE ASSEMBLY HAVING A ROTOR BEARING ASSEMBLY

TECHNICAL FIELD

This disclosure relates to an axle assembly that may have one or more rotor bearing assemblies that may rotatably support a rotor on a drive pinion.

BACKGROUND

An axle assembly having an electric motor module is disclosed in U.S. Patent Publication No. 2019/0054816.

SUMMARY

In at least one embodiment, an axle assembly is provided. The axle assembly may include an electric motor module, a drive pinion, and a rotor bearing assembly. The electric motor module may have a rotor that may be rotatable about a first axis. The drive pinion may extend through the rotor and may be rotatable about the first axis. The rotor bearing assembly may rotatably support the rotor on the drive pinion. The rotor bearing assembly may extend from the drive pinion to the rotor.

In at least one embodiment, an axle assembly is provided. The axle assembly may include an electric motor module, a drive pinion, a rotor coupling, a gear reduction module, and a rotor bearing assembly. The electric motor module may have a rotor that may be rotatable about a first axis. The drive pinion may extend through the rotor and may be rotatable about the first axis. The rotor coupling may be received inside the rotor and may engage the rotor. The rotor coupling may be fixedly positioned with respect to the rotor. The gear reduction module may operatively connect the rotor coupling to the drive pinion. The rotor bearing assembly may rotatably support the rotor and the rotor coupling. The rotor bearing assembly may extend from the drive pinion to the rotor coupling.

BRIEF DESCRIPTION OF THE DRAWINGS

FIGS. 5-7 show examples of how a rotor coupling may be coupled to a gear reduction module.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
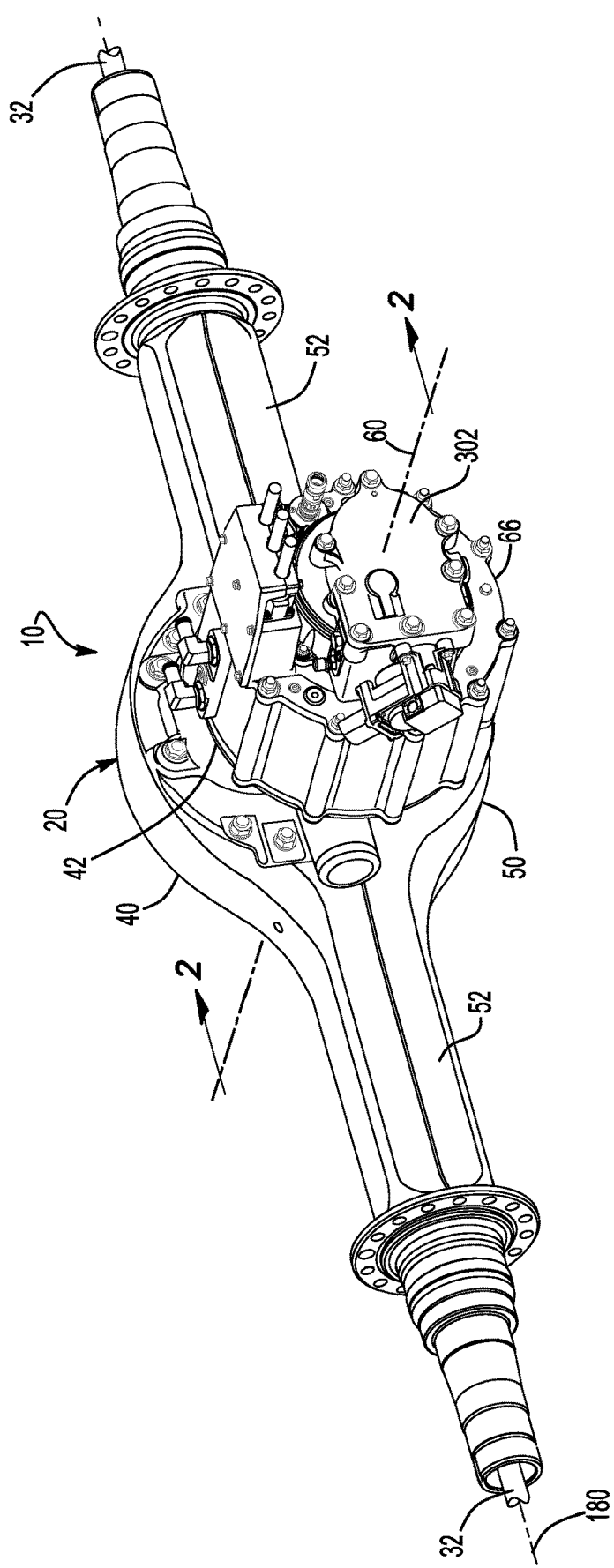
FIG. 1 is a perspective view of an axle assembly having an electric motor module and a gear reduction module.

Referring to FIG. 1, an example of an axle assembly 10 is shown. The axle assembly 10 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments. The axle assembly 10 may provide torque to one or more traction wheel assemblies that may include a tire mounted on a wheel. The wheel may be mounted to a wheel hub that may be rotatable about an axis.

One or more axle assemblies may be provided with the vehicle. As is best shown with reference to FIGS. 1 and 2, the axle assembly 10 may include a housing assembly 20, a drive pinion 22, an electric motor module 24, at least one rotor bearing assembly 26, a gear reduction module 28, a differential assembly 30, and at least one axle shaft 32.

Referring to FIG. 1, the housing assembly 20 may receive various components of the axle assembly 10. In addition, the housing assembly 20 may facilitate mounting of the axle assembly 10 to the vehicle. In at least one configuration, the housing assembly 20 may include an axle housing 40 and a differential carrier 42. In addition, the housing assembly 20 may include portions that may receive and/or facilitate mounting of the electric motor module 24, the gear reduction module 28, or both.

The axle housing 40 may receive and may support the axle shafts 32. In at least one configuration, the axle housing 40 may include a center portion 50 and at least one arm portion 52.

The center portion 50 may be disposed proximate the center of the axle housing 40. The center portion 50 may define a cavity that may receive the differential assembly 30. A lower region of the center portion 50 may at least partially define a sump portion that may contain a first lubricant. Splashed lubricant may flow down the sides of the center portion 50 and may flow over various internal components of the axle assembly 10 and gather in the sump portion.

One or more arm portions 52 may extend from the center portion 50. For example, two arm portions 52 may extend in opposite directions from the center portion 50 and away from the differential assembly 30. The arm portions 52 may have substantially similar configurations. For instance, the arm portions 52 may each have a hollow configuration or tubular configuration that may extend around and may receive a corresponding axle shaft 32 and may help separate or isolate the axle shaft 32 or a portion thereof from the surrounding environment. An arm portion 52 or a portion thereof may be integrally formed with the center portion 50. Alternatively, an arm portion 52 may be separate from the center portion 50. In such a configuration, each arm portion 52 may be attached to the center portion 50 in any suitable manner, such as by welding or with one or more fasteners. An arm portion may rotatably support an associated wheel hub. It is also contemplated that the arm portions 52 may be omitted.

Figure 2:
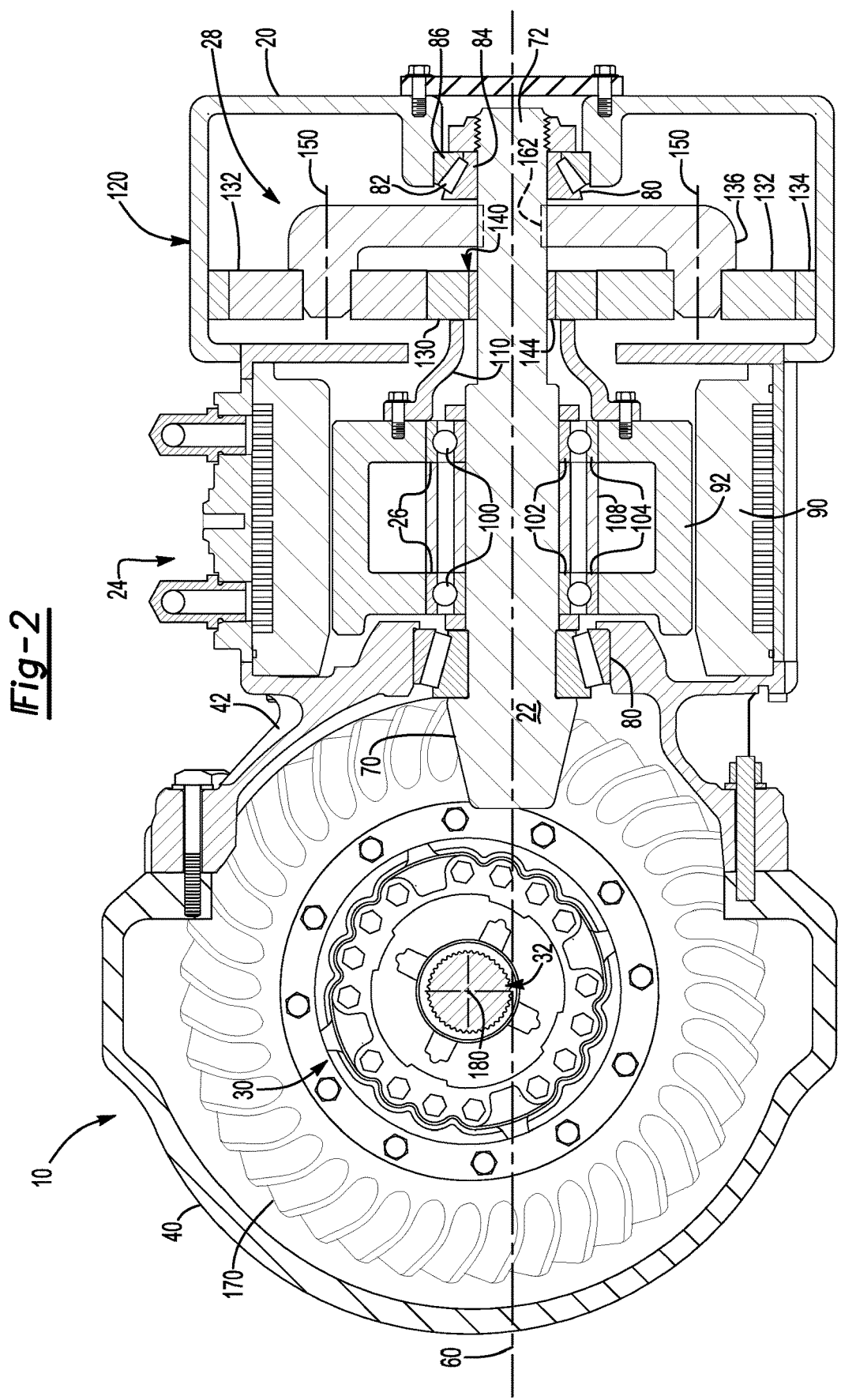
FIG. 2 is a section view of the axle assembly along section line 2-2.

Referring to FIGS. 1 and 2, the differential carrier 42, which may also be called a carrier housing, may be mounted to the center portion 50 of the axle housing 40. The differential carrier 42 may support the differential assembly 30. In at least one configuration, the differential carrier 42 may facilitate mounting of the electric motor module 24.

Referring to FIG. 2, the drive pinion 22 may provide torque to a ring gear that may be provided with the differential assembly 30. Moreover, the drive pinion 22 may help operatively connect the gear reduction module 28 to the differential assembly 30. The drive pinion 22 may extend along and may be rotatable about a first axis 60. In addition, the drive pinion 22 may extend through a hole or opening in the differential carrier 42 and into the axle housing 40. In at least one configuration, the drive pinion 22 may include a gear portion 70 and a shaft portion 72.

The gear portion 70 may be disposed at or near an end of the shaft portion 72. The gear portion 70 may have a plurality of teeth that may mate or mesh with corresponding teeth on the ring gear of the differential assembly 30. The gear portion 70 may be integrally formed with the shaft portion 72 or may be provided as a separate component that may be fixedly disposed on the shaft portion 72.

The shaft portion 72 may extend from the gear portion 70 in a direction that extends away from the axle housing 40. The shaft portion 72 may extend along the first axis 60.

The shaft portion 72 may be rotatably supported by one or more drive pinion bearings 80. In the configuration shown, the shaft portion 72 is illustrated as being rotatably supported by a pair of drive pinion bearings 80. For convenience in reference, the drive pinion bearing located closest to the gear portion 70 may be referred to as a first drive pinion bearing 80 while the drive pinion bearing located furthest from the gear portion 70 may be referred to as a second drive pinion bearing 80. The drive pinion bearings 80 may have any suitable configuration. For example, a drive pinion bearing 80 may be configured as a roller bearing assembly that may include a plurality of bearing elements 82 that may be disposed between an inner race 84 and an outer race 86. The inner race 84 may extend around and may be disposed on the shaft portion 72. The outer race 86 may extend around the bearing elements 82 and may be disposed on the housing assembly 20 or may be fixedly positioned with respect to at least a portion of the housing assembly 20.

Referring to FIG. 2, the electric motor module 24 may provide torque to the differential assembly 30 via the drive pinion 22 and the gear reduction module 28. In at least one configuration, the electric motor module 24 may be mounted to the differential carrier 42 and may be axially positioned between the axle housing 40 and the gear reduction module 28. The electric motor module 24 may include a stator 90 and a rotor 92.

The stator 90 may be fixedly positioned with respect to the housing assembly 20. For example, the stator 90 may extend around the first axis 60 and may not rotate about the first axis 60. The stator 90 may include windings that may be electrically connected to an electrical power source, such as a battery, capacitor, or the like. An inverter may electrically connect the electric motor module 24 and the electrical power source.

The rotor 92 may be rotatable about the first axis 60 with respect to the differential carrier 42 and the stator 90. For example, the rotor 92 may be spaced apart from the stator 90 but may be disposed close to the stator 90. The rotor 92 may include magnets or ferromagnetic material that may facilitate the generation of electrical current. The rotor 92 may extend continuously around the drive pinion 22. The drive pinion 22 may extend through the rotor 92.

One or more rotor bearing assemblies 26 may rotatably support the rotor 92 on the drive pinion 22. In the configuration shown, the rotor 92 is illustrated as being rotatably supported by a pair of rotor bearing assemblies 26. For convenience in reference, the rotor bearing assembly located closest to the gear portion 70 of the drive pinion 22 may be referred to as a first rotor bearing assembly while the drive pinion bearing located furthest from the gear portion 70 may be referred to as a second rotor bearing assembly; however, it is contemplated that these designations may be reversed.

The rotor bearing assemblies 26 may be received inside the rotor 92 and may extend between the drive pinion 22 and the rotor 92. The rotor bearing assemblies 26 may have any suitable configuration. For example, a rotor bearing assembly 26 may be configured as a roller bearing assembly that may include a plurality of bearing elements 100 that may be disposed between an inner race 102 and an outer race 104. In at least one configuration, the bearing elements 100 may extend from the inner race 102 to the outer race 104. The inner race 102 may extend around and may be disposed on the drive pinion 22. For instance, the inner race 102 may extend around and may contact the shaft portion 72 of the drive pinion 22. The outer race 104 may extend around the bearing elements 100 and the inner race 102. The outer race 104 may be disposed on the rotor 92 or may be fixedly positioned with respect to the rotor 92. For example, the outer race 104 may engage the rotor 92 or may contact the rotor 92. It is also contemplated that the outer race 104 may be disposed on or may contact a rotor coupling as will be discussed in more detail below. The rotor bearing assemblies 26 may be spaced apart from the differential carrier 42. For instance, the rotor bearing assemblies 26 may not receive, contact, or engage the differential carrier 42 or a bearing support wall that may extend from the differential carrier 42.

In a configuration having first and second rotor bearing assemblies 26, 26, a spacer 108 may be provided. The spacer 108 may be received inside the rotor coupling 110 and may help separate and inhibit axial movement of the first and second rotor bearing assemblies 26, 26. For instance, one or more spacers 108 may extend from the inner race 102 of the first rotor bearing assembly 26 to the inner race 102 of the second rotor bearing assembly 26, may extend from the outer race 104 of the first rotor beating assembly 26 to the outer race 104 of the second rotor bearing assembly 26, or both.

A rotor coupling 110 may operatively connect the rotor 92 to the gear reduction module 28. For example, the rotor coupling 110 may extend from the rotor 92 or may be operatively connected to the rotor 92 such that the rotor 92 and the rotor coupling 110 may be rotatable together about the first axis 60. The rotor coupling 110 may be fixedly coupled to the rotor 92 at or proximate a first end of the rotor coupling 110 and may be coupled to the gear reduction module 28 proximate a second end. In at least one configuration, the rotor coupling 110 may be configured as a hollow tube that may extend around the first axis 60 and may receive the shaft portion 72 of the drive pinion 22. The first end of the rotor coupling may engage the outer race 104 of the second rotor bearing assembly 26 to inhibit axial movement of the second rotor bearing assembly 26 toward the gear reduction module 28. The rotor coupling 110 may be fixedly coupled to the rotor 92 and may be fixedly coupled to a first gear of the gear reduction module 28 as will be discussed in more detail below. For instance, the rotor coupling 110 may extend from the rotor 92 to the first gear. The rotor coupling 110 may be spaced apart from the differential carrier 42. For instance, the rotor coupling 110 may not receive, contact, or engage the differential carrier 42 or a bearing support wall that may extend from the differential carrier 42.

Referring to FIG. 2, the gear reduction module 28 may transmit torque between the electric motor module 24 and the drive pinion 22.

The gear reduction module 28 may be provided in various configurations, such as a planetary gear set configuration or a non-planetary gear set configuration. In FIG. 2, the gear reduction module 28 has a planetary gear set 120. In such a configuration, the gear reduction module 28 may include a first gear 130, at least one planet gear 132, a planetary ring gear 134, and a planet gear carrier 136.

The first gear 130, which may also be referred to as a sun gear, may be disposed proximate the center of the planetary gear set 120 and may be rotatable about the first axis 60. In addition, the first gear 130 may be operatively connected to the rotor 92 as will be discussed in more detail below. In at least one configuration, the first gear 130 may be configured as a hollow tubular body that may include a first gear hole 140 and a gear portion.

The first gear hole 140 may be a through hole that may extend through the first gear 130. The first gear hole 140 may extend along and may be centered about the first axis 60. The drive pinion 22 may extend through the first gear hole 140 and may be spaced apart from the first gear 130.

The gear portion may be disposed opposite the first gear hole 140 and may have teeth that may extend away from the first gear hole 140. The teeth of the gear portion may mate or mesh with teeth of the planet gears 132.

Optionally, a bearing 144 may be received in the first gear hole 140 that may rotatably support the first gear 130 on the shaft portion 72 of the drive pinion 22. If provided, the bearing 144 may receive the shaft portion 72 and may extend from the shaft portion 72 to the first gear 130.

One or more planet gears 132 may be rotatably disposed between the first gear 130 and the planetary ring gear 134. Each planet gear 132 may have a hole and a set of teeth. The hole may extend at least partially through the planet gear 132. The set of teeth may be disposed opposite the hole. The set of teeth may mesh with teeth of the gear portion of the first gear 130 and teeth on the planetary ring gear 134. The teeth may have any suitable configuration. For instance, the teeth may have a helical configuration, but it is contemplated that other tooth configurations may be provided. Each planet gear 132 may be configured to rotate about a different planet gear axis of rotation 150. A planet gear axis of rotation 150 may extend substantially parallel to the first axis 60.

The planetary ring gear 134 may extend around the first axis 60 and may receive the planet gears 132. The planetary ring gear 134 may include a set of planetary ring gear teeth that may extend toward the first axis 60 and may mesh with teeth on the planet gears 132. The planetary ring gear 134 may be stationary with respect to the first axis 60. For example, the planetary ring gear 134 may be received in and may be fixedly disposed on the housing assembly 20.

The planet gear carrier 136 may be rotatable about the first axis 60 and may rotatably support the planet gears 132. For instance, each planet gear 132 may be rotatably disposed on a corresponding pin, shaft, or linkage that may extend from the planet gear carrier 136. In addition, the planet gear carrier 136 may be fixedly coupled to the drive pinion 22. In at least one configuration, the planet gear carrier 136 may include a planet gear carrier hole 160 and a planet gear carrier coupling portion 162.

The planet gear carrier hole 160 may be a through hole that may extend through planet gear carrier 136. The planet gear carrier hole 160 may extend along and may be centered about the first axis 60. The shaft portion 72 of the drive pinion 22 may be received in and may extend completely through the planet gear carrier hole 160.

The planet gear carrier coupling portion 162 may facilitate coupling of the planet gear carrier 136 to the drive pinion 22 such that the drive pinion 22 and the planet gear carrier 136 are rotatable together about the first axis 60 and such that the drive pinion 22 and the planet gear carrier 136 may not be rotatable about the first axis 60 with respect to each other. The planet gear carrier coupling portion 162 may have any suitable configuration. For instance, the planet gear carrier coupling portion 162 may be configured as a spline, gear, or set of teeth that may mesh with a corresponding spline, gear or set of teeth on the drive pinion 22 to inhibit relative rotational movement of the drive pinion 22 and the planet gear carrier 136. In such a configuration, the planet gear carrier coupling portion 162 may be completely or partially received in the planet gear carrier hole 160 and may have one or more teeth that may extend toward the first axis 60. Alternatively, the planet gear carrier coupling portion 162 may be configured as a weld, fastener, or the like that may couple the drive pinion 22 to the planet gear carrier 136.

As previously mentioned, the drive pinion bearing located closest to the gear portion 70 may be referred to as a first drive pinion bearing 80 while the drive pinion bearing located furthest from the gear portion 70 may be referred to as a second drive pinion bearing 80. The rotor 92 and the planetary gear set 120 may be axially positioned between the first drive pinion bearing 80 and the second drive pinion bearing 80. In FIG. 2, the planetary gear set 120 may be axially positioned between the rotor 92 and the second drive pinion bearing 80.

Referring to FIG. 2, the differential assembly 30 may be at least partially received in the center portion 50 of the housing assembly 20. The differential assembly 30 may transmit torque to the wheels and permit the wheels to rotate at different velocities. The differential assembly 30 may be operatively connected to the axle shafts 32 and may permit the axle shafts 32 to rotate at different rotational speeds in a manner known by those skilled in the art. The differential assembly 30 may have a ring gear 170 that may have teeth the mate or mesh with the teeth of the gear portion 70 of the drive pinion 22. Accordingly, the differential assembly 30 may receive torque from the drive pinion 22 via the ring gear 170 and transmit torque to the axle shafts 32.

Referring to FIGS. 1 and 2, the axle shafts 32 may transmit torque from the differential assembly 30 to corresponding wheel hubs and wheels. Two axle shafts 32 may be provided such that each axle shaft 32 extends through a different arm portion 52 of axle housing 40. The axle shafts 32 may extend along and may be rotatable about a second axis 180. Each axle shaft 32 may have a first end and a second end. The first end may be operatively connected to the differential assembly 30. The second end may be disposed opposite the first end and may be operatively connected to a wheel. Optionally, gear reduction may be provided between an axle shaft 32 and a wheel.

Figure 3:
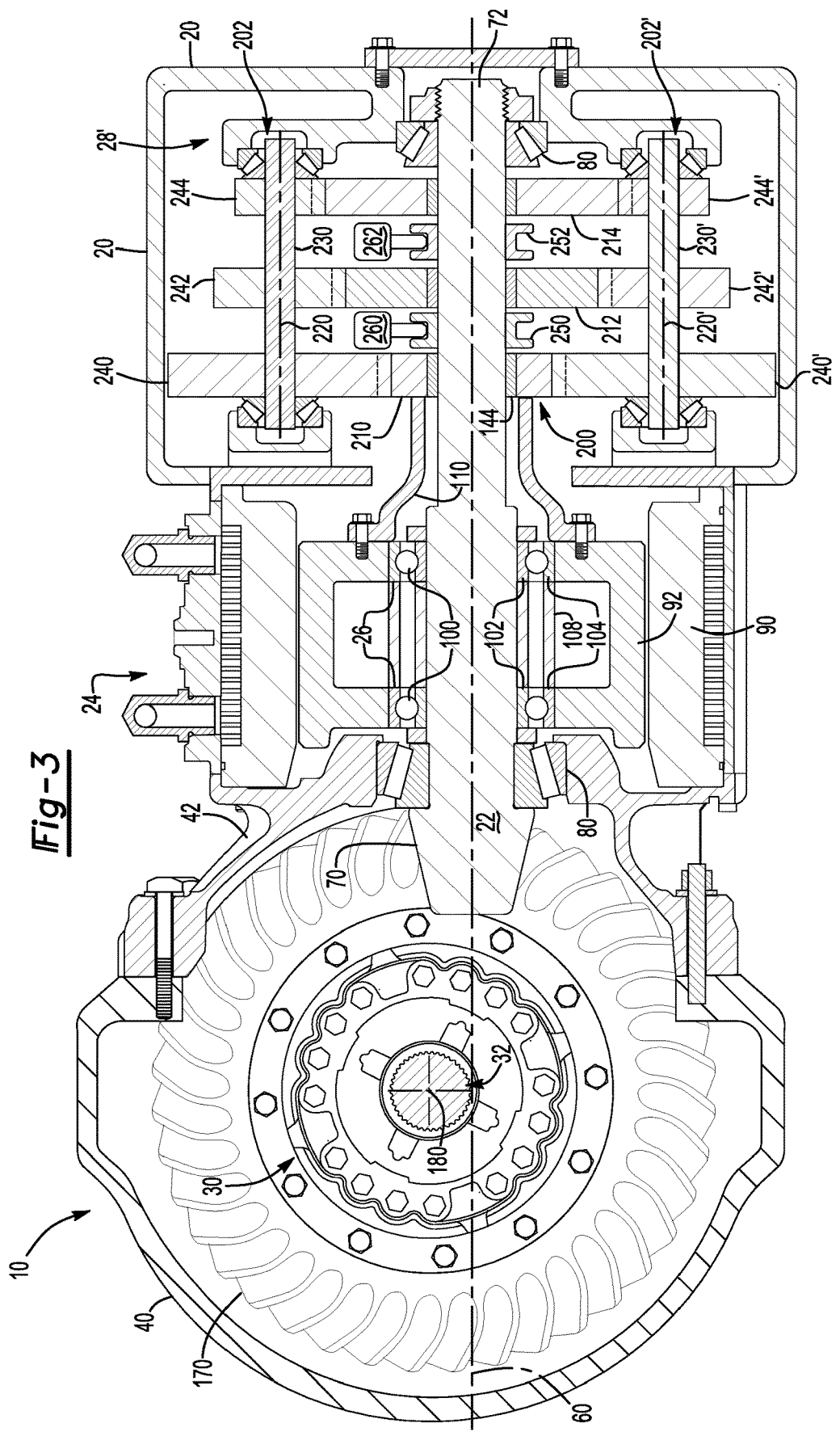
FIG. 3 is a section view of another configuration of the axle assembly.

Referring to FIG. 3, another example of an axle assembly is shown. The axle assembly in FIG. 3 is similar to the axle assembly shown in FIG. 2, but the gear reduction module 28' is configured as a countershaft transmission. More specifically, the gear reduction module 28' may include a set of drive pinion gears 200, a first countershaft subassembly 202, and a second countershaft subassembly 202'.

The set of drive pinion gears 200 may include a plurality of gears that may be selectively coupled to the drive pinion 22. In the configuration shown, the set of drive pinion gears 200 includes a first gear 210, a second gear 212, and a third gear 214; however, it is to be understood that a greater or lesser number of gears may be provided. A member of the set of drive pinion gears 200 may be rotatable about the first axis 60 with the drive pinion 22 when that gear is coupled to the drive pinion 22. Conversely, the drive pinion 22 may be rotatable about the first axis 60 with respect to a member of the set of drive pinion gears 200 that is decoupled from or not coupled to the drive pinion 22. A member of the set of drive pinion gears 200 may be selectively coupled to the drive pinion 22 in any suitable manner, such as with a clutch as will be discussed in more detail below. In at least one configuration, no more than one gear of the set of drive pinion gears 200 may be coupled to the drive pinion 22 at the same time when the drive pinion 22 rotates about the first axis 60.

The first gear 210 may receive the shaft portion 72 of the drive pinion 22. For example, the first gear 210 may have a through hole through which the shaft portion 72 may extend. The first gear 210 may extend around the first axis 60 and the shaft portion 72 and may have a plurality of teeth that may be arranged around and may face away from the first axis 60. The teeth of the first gear 210 may contact and may mate or mesh with teeth of a first countershaft gear that may be provided with the first countershaft subassembly 202 and the second countershaft subassembly 202' as will be discussed in more detail below. The first gear 210 may be operatively connected to the rotor 92 of the electric motor module 24 such that the rotor 92 and the first gear 210 are rotatable together about the first axis 60. For example, the first gear 210 may be fixedly positioned with respect to the rotor 92 or fixedly coupled to the rotor 92 such that the first gear 210 does not rotate about the first axis 60 with respect to the rotor 92. In at least one configuration, the first gear 210 may be axially positioned along the first axis 60 between the second gear 212 and the electric motor module 24.

The second gear 212 may receive the shaft portion 72 of the drive pinion 22. For example, the second gear 212 may have a through hole through which the shaft portion 72 may extend. The second gear 212 may extend around the first axis 60 and the shaft portion 72 and may have a plurality of teeth that may be arranged around and may face away from the first axis 60. The teeth of the second gear 212 may contact and may mate or mesh with teeth of a second countershaft gear that may be provided with the first countershaft subassembly 202 and the second countershaft subassembly 202' as will be discussed in more detail below. The second gear 212 may have a different diameter than the first gear 210 and the third gear 214. For example, the second gear 212 may have a larger diameter than the first gear 210 and a smaller diameter than the third gear 214. In at least one configuration, the second gear 212 may be axially positioned along the first axis 60 between the first gear 210 and the third gear 214.

The third gear 214 may receive the shaft portion 72 of the drive pinion 22. For example, the third gear 214 may have a through hole through which the shaft portion 72 may extend. The third gear 214 may extend around the first axis 60 and the shaft portion 72 and may have a plurality of teeth that may be arranged around and may face away from the first axis 60. The teeth of the third gear 214 may contact and may mate or mesh with teeth of a third countershaft gear that may be provided with the first countershaft subassembly 202 and the second countershaft subassembly 202' as will be discussed in more detail below. The third gear 214 may have a different diameter than the first gear 210 and the second gear 212. For example, the third gear 214 may have a larger diameter than the first gear 210 and the second gear 212. In at least one configuration, the third gear 214 be axially positioned along the first axis 60 further from the electric motor module 24 than the first gear 210 and the second gear 212.

Optionally, a bearing 144 such as a roller bearing may receive the shaft portion 72 and may rotatably support a corresponding gear. For instance, a first bearing may be received between the first gear 210 and the shaft portion 72, a second bearing may be received between the second gear 212 and the shaft portion 72, and so on to facilitate rotation of the drive pinion 22 with respect to a gear when the gear is not coupled to the drive pinion 22.

The first countershaft subassembly 202 may be at least partially received in the housing assembly 20. The first countershaft subassembly 202 may be rotatable about a first countershaft axis 220. The first countershaft axis 220 may be disposed parallel or substantially parallel to the first axis 60 in one or more embodiments. The first countershaft subassembly 202 may be spaced apart from the differential assembly 30 such that the electric motor module 24 may be positioned along the first axis 60 between the first countershaft subassembly 202 and the differential assembly 30. The first countershaft subassembly 202 may include a first countershaft 230 and a plurality of gears. In the configuration shown, the plurality of gears of the first countershaft subassembly 202 include a first countershaft gear 240, a second countershaft gear 242, and a third countershaft gear 244; however, it is contemplated that a greater number of gears or a lesser number of gears may be provided.

The first countershaft 230 may be rotatable about the first countershaft axis 220. For instance, the first countershaft 230 may be rotatably supported on the housing assembly 20 by one or more roller bearing assemblies. As an example, a roller bearing assembly may be located near opposing first and second ends the first countershaft 230. The roller bearing assembly may have any suitable configuration. For instance, the roller bearing assembly may include a plurality of rolling elements that may be disposed between an inner race and an outer race. The inner race may be mounted to the first countershaft 230 and may extend around and may receive the first countershaft 230. The outer race may extend around the inner race and may be mounted to the housing assembly 20. The first countershaft 230 may support the first countershaft gear 240, the second countershaft gear 242, and the third countershaft gear 244.

The first countershaft gear 240 may be fixedly disposed on the first countershaft 230 or fixedly mounted to the first countershaft 230. As such, the first countershaft gear 240 may rotate about the first countershaft axis 220 with the first countershaft 230. For example, the first countershaft gear 240 may have a hole that may receive the first countershaft 230 and may be fixedly coupled to the first countershaft 230. The first countershaft gear 240 may extend around the first countershaft axis 220 and may have a plurality of teeth that may be arranged around and may face away from the first countershaft axis 220. The teeth of the first countershaft gear 240 may contact and may mate or mesh with the teeth of the first gear 210. In at least one configuration, the first countershaft gear 240 may be axially positioned along the first countershaft axis 220 between the second countershaft gear 242 of the first countershaft subassembly 202 and the electric motor module 24.

The second countershaft gear 242 may be fixedly disposed on the first countershaft 230 or fixedly mounted to the first countershaft 230. As such, the second countershaft gear 242 may rotate about the first countershaft axis 220 with the first countershaft 230. For example, the second countershaft gear 242 may have a hole that may receive the first countershaft 230 and may be fixedly coupled to the first countershaft 230. The second countershaft gear 242 may extend around the first countershaft axis 220 and may have a plurality of teeth that may be arranged around and may face away from the first countershaft axis 220. The teeth of the second countershaft gear 242 may contact and may mate or mesh with the teeth of the second gear 212. The second countershaft gear 242 may have a different diameter than the second countershaft gear 242 and the third countershaft gear 244. In at least one configuration, the second countershaft gear 242 may be axially positioned along the first countershaft axis 220 between the first countershaft gear 240 of the first countershaft subassembly 202 and the third countershaft gear 244 of the first countershaft subassembly 202.

The third countershaft gear 244 may be fixedly disposed on the first countershaft 230 or fixedly mounted to the first countershaft 230. As such, the third countershaft gear 244 may rotate about the first countershaft axis 220 with the first countershaft 230. For example, the third countershaft gear 244 may have a hole that may receive the first countershaft 230 and may be fixedly coupled to the first countershaft 230. The third countershaft gear 244 may extend around the first countershaft axis 220 and may have a plurality of teeth that may be arranged around and may face away from the first countershaft axis 220. The teeth of the third countershaft gear 244 may contact and may mate or mesh with the teeth of the third gear 214. The third countershaft gear 244 may have a different diameter than the first countershaft gear 240 and the second countershaft gear 242. In at least one configuration, the third countershaft gear 244 may be axially positioned along the first countershaft axis 220 further from the electric motor module 24 than the first countershaft gear 240 and the second countershaft gear 242 of the first countershaft subassembly 202.

The second countershaft subassembly 202' may be at least partially received in the housing assembly 20 and may be rotatable about a second countershaft axis 220'. The second countershaft axis 220' may be disposed parallel or substantially parallel to the first countershaft axis 220 in one or more embodiments. The second countershaft subassembly 202' may be spaced apart from the differential assembly 30 such that the electric motor module 24 may be positioned along the first axis 60 between the second countershaft subassembly 202' and the differential assembly 30. The second countershaft subassembly 202' may generally be disposed on an opposite side of the first axis 60 from the first countershaft subassembly 202 or may be disposed directly opposite the first countershaft subassembly 202. Moreover, the second countershaft subassembly 202' may have substantially the same configuration as the first countershaft subassembly 202. For example, the second countershaft subassembly 202' may include a second countershaft 230' that may be analogous to or may have the same structure as the first countershaft 230. In addition, the second countershaft subassembly 202' may include a plurality of gears. In the configuration shown, the plurality of gears of the second countershaft subassembly 202' include a first countershaft gear 240', a second countershaft gear 242', and a third countershaft gear 244'; however, it is contemplated that a greater number of gears or a lesser number of gears may be provided. The first countershaft gear 240', a second countershaft gear 242', and a third countershaft gear 244' of the second countershaft subassembly 202' may be analogous to or may have the same structure as the first countershaft gear 240, a second countershaft gear 242, and a third countershaft gear 244, respectively, of the first countershaft subassembly 202, may be arranged along second countershaft axis 220' rather than the first countershaft axis 220, and may be fixed to the second countershaft 230' rather than the first countershaft 230.

The first gear 210 and the first countershaft gears 240, 240' may provide a different gear ratio than the second gear 212 and the second countershaft gears 242, 242' and may provide a different gear ratio than the third gear 214 and the third countershaft gears 244, 244'. As a non-limiting example, the first gear 210 and the first countershaft gears 240, 240' may provide a gear ratio of more than 2:1, the second gear 212 and the second countershaft gears 242, 242' may provide a gear ratio from 1:1 to 2:1, and the third gear 214 and the third countershaft gears 244, 244' may provide a gear ratio of 1:1 or less. For instance, the first countershaft gears 240, 240' may have a larger diameter than the first gear 210, the second countershaft gears 242, 242', and the third countershaft gears 244, 244'. The second countershaft gears 242, 242' may have a larger diameter than the second gear 212 and the third countershaft gears 244, 244'. The third gear 214 may have the same diameter as the third countershaft gears 244, 244'.

It is also contemplated that other gear configurations may be provided. As one example, the first gear 210 may have a larger diameter than the second gear 212 and the third gear 214. As another example, gears or gear pairings may be arranged in different sequences along their respective axes. As another example, multiple meshing gear pairings or no gear pairings may provide "overdrive" gear ratios of less than 1:1. As another example, multiple meshing gear pairings may provide gear ratios of greater than 1:1. As such, gear ratios may be provided that are greater than 1:1, less than 1:1, equal (i.e., 1:1), or combinations thereof.

The teeth of the countershaft transmission gears may be of any suitable type. As a non-limiting example, the meshing teeth of the members of the set of drive pinion gears 200 and the gears of the first countershaft subassembly 202 and the second countershaft subassembly 202' may, have a helical configuration.

A control system may control operation of the axle assembly. The control system may include one or more electronic controllers, such as a microprocessor-based controller, that may monitor and/or control operation of various components of the axle assembly. In addition, the control system may control coupling and decoupling of the gears of the set of drive pinion gears 200 to and from the drive pinion 22. For instance, the control system may control operation of one or more clutches that may couple/decouple at least one member of the set of drive pinion gears 200 to/from the drive pinion 22.

A clutch may have any suitable configuration. The clutch may be configured as a disc clutch that may include friction discs that may be selectively engaged to couple a gear to a corresponding shaft. Alternatively, the clutch may be configured as a dog clutch or clutch collar that may receive, rotate with, and slide along a corresponding shaft to selectively couple and decouple one or more members of the set of drive pinion gears 200 to the drive pinion 22. For example, a clutch that is configured as a dog clutch or a clutch collar may have a through hole that may receive the shaft portion 72 of the drive pinion 22 and may rotate about the first axis 60 with the shaft portion 72. For instance, the clutch and shaft portion 72 may have mating splines that inhibit rotation of the clutch with respect to the shaft portion 72 while allowing the clutch to slide in an axial direction along the first axis 60 with respect to the shaft portion 72 to engage or disengage a member of the set of drive pinion gears 200. Such a clutch may have a tooth or teeth that may be configured to selectively mate or mesh with corresponding teeth on a member of the set of drive pinion gears 200 to couple the gear to the shaft portion 72 such that the gear rotates about the first axis 60 with the drive pinion 22. The tooth or teeth of the clutch may be configured as a face gear that may be disposed along a lateral side of the clutch or may be configured like a spline and may be received inside a hole of a member of the set of drive pinion gears 200. Clutches will primarily be described below as having a dog clutch or clutch collar configuration; however, it is to be understood that a clutch may have a different configuration and may not be configured as a dog clutch or a clutch collar, that a different number of clutches may be provided, and that clutches may be associated with a single member of the set of drive pinion gears 200 rather than multiple drive pinion gears or vice versa.

In at least one configuration, a first clutch 250 and a second clutch 252 may be provided. The first clutch 250 may be axially positioned along the first axis 60 between the first gear 210 and the second gear 212 while the second clutch 252 may be axially positioned between the second gear 212 and the third gear 214. The first clutch 250 and the second clutch 252 may be configured to selectively couple a single gear or multiple gears to the drive pinion 22. For instance, the first clutch 250 may selectively couple the first gear 210 to the drive pinion 22 or may selectively couple the first gear 210 or the second gear 212 to the drive pinion 22. The second clutch 252 may selectively couple the third gear 214 to the drive pinion 22 or may selectively couple the third gear 214 or the second gear 212 to the drive pinion 22. It is contemplated that a single actuator may be provided to actuate multiple clutches, like the first clutch 250 and the second clutch 252, or that different actuators may actuate different clutches.

The first clutch 250 may be operatively connected to a first actuator 260 that may be configured to move the first clutch 250 along the first axis 60. For example, a linkage, such as a shift fork, may operatively connect the first clutch 250 to the first actuator 260. The first actuator 260 may be of any suitable type. For example, the first actuator 260 may be an electrical, electromechanical, pneumatic, or hydraulic actuator. In at least one configuration, such as when the first clutch 250 is a clutch collar or dog clutch, the first actuator 260 may move the first clutch 250 along the first axis 60 and may execute a shift when the rotational speed of the first clutch 250 and a corresponding member of the set of drive pinion gears 200 are sufficiently synchronized to complete a shift so that the teeth of the first clutch 250 may mesh with teeth on a drive pinion gear or so that the teeth of the first clutch 250 gear may disengage from teeth on a drive pinion gear. The control system may monitor and/or control operation of the first actuator 260.

The second clutch 252 may be operatively connected to a second actuator 262 that may be configured to move the second clutch 252 along the first axis 60. It is also contemplated that a single actuator may be provided to actuate multiple clutches, like the first clutch 250 and the second clutch 252. For example, a linkage, such as a shift fork, may operatively connect the second clutch 252 to the second actuator 262. The second actuator 262 may be of any suitable type. For example, the second actuator 262 may be an electrical, electromechanical, pneumatic, or hydraulic actuator. In at least one configuration, such as when the second clutch 252 is a clutch collar or dog clutch, the second actuator 262 may move the second clutch 252 along the first axis 60 and may execute a shift when the rotational speed of the second clutch 252 and a corresponding member of the set of drive pinion gears 200 are sufficiently synchronized to complete a shift so that the teeth of the second clutch 252 may mesh with teeth on a drive pinion gear or so that the teeth of the second clutch 252 gear may disengage from teeth on a drive pinion gear. The control system may monitor and/or control operation of the second actuator 262.

Sufficient synchronization to permit shifting or movement of a clutch, like the first clutch 250 or the second clutch 252, may be attained using a gear synchronizer, by controlling the rotational speed of the rotor 92, or combinations thereof. Such synchronization components or control actions may be omitted with different clutch configurations, such as a clutch that is a disc clutch.

Figure 4:
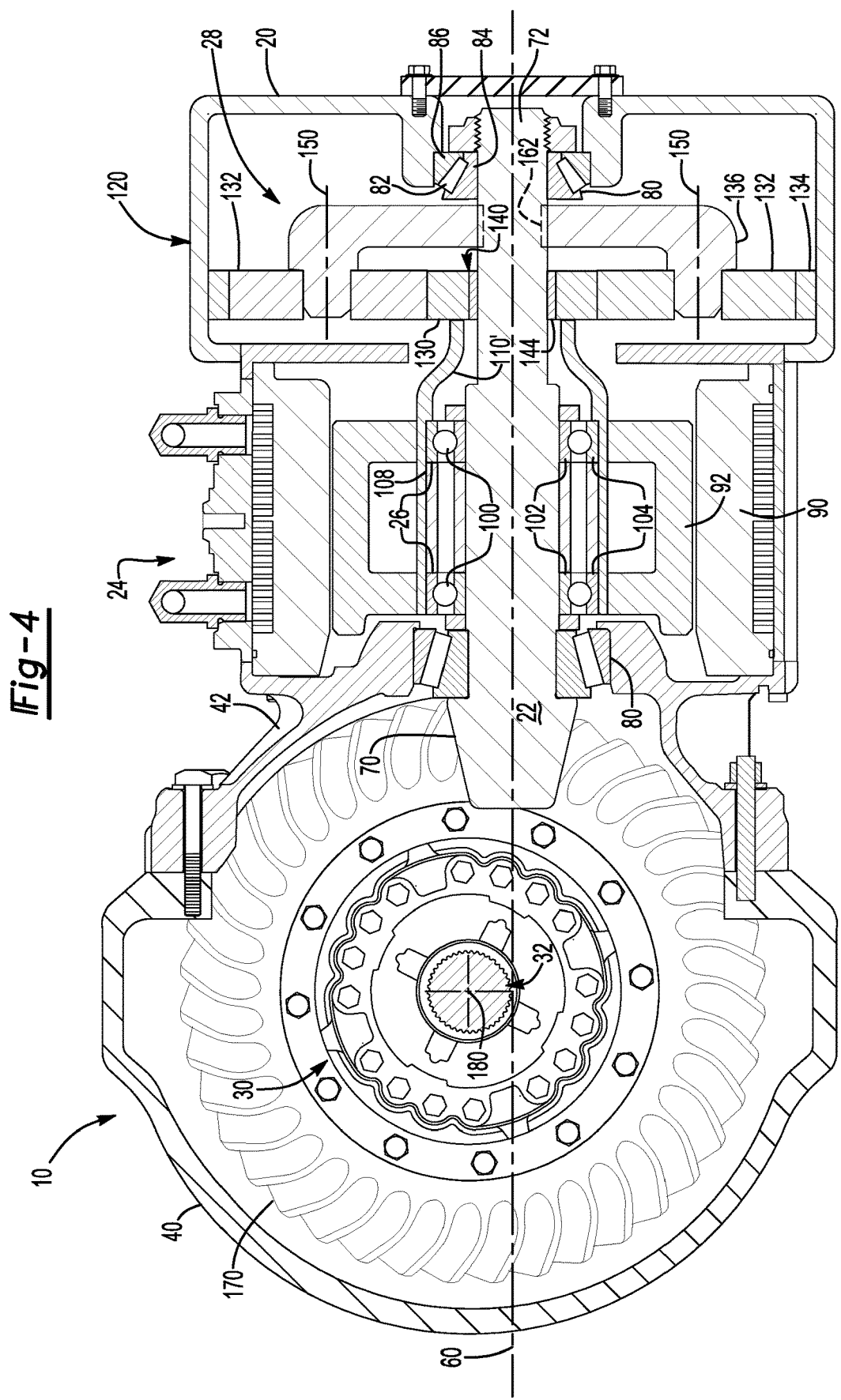
FIG. 4 is a section view of another configuration of the axle assembly.

Referring to FIG. 4, another example of an axle assembly is shown. The axle assembly in FIG. 4 is similar to the axle assembly shown in FIG. 2 except for the configuration of the rotor coupling.

The rotor coupling 110' in FIG. 4 may share some characteristics with the rotor coupling 110 shown in FIG. 2. For example, the rotor coupling 110' may operatively connect the rotor 92 to the gear reduction module 28 or 28' such that the rotor 92 and the rotor coupling 110' may be rotatable together about the first axis 60. The rotor coupling 110' may engage the rotor 92 and may be fixedly positioned with respect to the rotor 92, such as by being fixedly coupled to the rotor 92 proximate a first end and may be coupled to the gear reduction module 28 proximate a second end. The rotor coupling 110' may be fixedly coupled to a first gear 130, 210 of the gear reduction module 28. In addition, the rotor coupling 110' may be configured as a hollow tube that may extend around the first axis 60 and may receive the shaft portion 72 of the drive pinion 22. The rotor coupling 110' may be spaced apart from the differential carrier 42. For instance, the rotor coupling 110' may not receive, contact, or engage the differential carrier 42 or a bearing support wall that may extend from the differential carrier 42.

Unlike the configuration shown in FIG. 2, the rotor coupling 110' in FIG. 4 may be received inside the rotor 92. For example, the rotor coupling 110' may have a greater axial length and may extend into a hole defined by the rotor 92. The rotor coupling 110' may be radially, positioned between the rotor 92 and one or more rotor bearing assemblies 26. For instance, the rotor coupling 110' may be received inside and may contact an interior side of the rotor 92 that may face toward the first axis 60 while first and second rotor bearing assemblies 26, 26 may be received inside the rotor coupling 110' and may engage or contact an interior side of the rotor coupling 110' that may be disposed opposite and may face away from the rotor 92. The rotor bearing assemblies 26, 26 may extend from the drive pinion 22 to the rotor coupling 110'. It is to be understood that the rotor coupling 110' shown in FIG. 4 may be used with the axle assembly configuration shown in FIG. 3.

Referring to FIGS. 5-7, multiple examples of how the rotor coupling 110, 110' may be connected to the first gear 130, 210 are shown. The configurations shown in FIGS. 5-7 may be employed with any of the axle assembly configurations previously discussed, such as the axle configuration shown in FIGS. 2-4.

Referring to FIG. 5, an example of a connection interface is shown in which the rotor coupling 110, 110' is partially received inside the first gear 130, 210. In such a configuration, the first gear 130, 210 may have a mounting ring 300.

The mounting ring 300 may extend around the drive pinion 22 and may extend in an axial direction toward the rotor 92, or to the left from the perspective shown. The mounting ring 300 may have a mounting ring spline 302. The mounting ring spline 302 may extend toward the drive pinion 22 and may extend from a first side 304 of the first gear 130, 210.

The rotor coupling 110, 110' may be received inside the mounting ring 300. The rotor coupling 110, 110' may have a rotor coupling spline 310. The rotor coupling spline 310 may face away from the drive pinion 22 and may mesh with the mounting ring spline 302 to inhibit rotation of the rotor coupling 110, 110' with respect to the first gear 130, 210.

Referring to FIG. 6, an example of a connection interface is shown in which the rotor coupling 110, 110' may receive a portion of the first gear 130, 210. In such a configuration, the first gear 130, 210 may have a mounting ring 300.

The mounting ring 300 that may extend around the drive pinion 22 and may extend in an axial direction toward the rotor 92. The mounting ring 300 may be received inside the rotor coupling 110, 110'. The mounting ring 300 may have a mounting ring spline 302'. The mounting ring spline 302' may face away from the drive pinion 22 and may extend from a first side 304 of the first gear 130, 210.

The rotor coupling 110, 110' may receive the mounting ring 300. The rotor coupling 110, 110' may have a rotor coupling spline 310. The rotor coupling spline 310 may face toward and may extend toward the drive pinion 22. The rotor coupling spline 310 may mesh with the mounting ring spline 302 to inhibit rotation of the rotor coupling 110, 110' with respect to the first gear 130, 210.

Referring to FIG. 7, an example of a connection interface is shown in which the rotor coupling 110, 110' may be integrally formed with the first gear 130, 210.

The axle assembly configurations described above may allow a rotor to be packaged closer to a drive pinion without an intervening fixed component such as a differential carrier or bearing support wall that extends from the differential carrier being radially positioned between the rotor and drive pinion. As a result, smaller diameter bearing assemblies may be used to support the rotor that can better handle the high rotational speeds of the rotor and the relative rotational speed of the rotor bearings may be reduced. The use of smaller diameter bearings may help reduce associated bearing temperatures and lubrication requirements, which may help improve durability. The use of smaller bearings may also allow electric motors having higher rotational speeds to be used. Elimination of an intervening fixed component such as a differential carrier or bearing support wall may also allow a smaller diameter motor to be used, which may reduce cost and weight.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
   an electric motor module having a rotor that is rotatable about a first axis;
   a drive pinion that extends through the rotor and is rotatable about the first axis;
   a rotor bearing assembly that rotatably supports the rotor on the drive pinion, wherein the rotor bearing assembly extends from the drive pinion to the rotor;
   a gear reduction module that has a planetary gear set that includes a first gear that is operatively connected to the rotor, a planetary ring gear, a planet gear that meshes with the first gear and the planetary ring gear, and a planet gear carrier that rotatably supports the planet gear and is fixedly coupled to the drive pinion; and
   a first drive pinion bearing and a second drive pinion bearing that rotatably support the drive pinion, wherein the rotor and the planetary gear set are axially positioned between the first drive pinion bearing and the second drive pinion bearing.

2. The axle assembly of claim 1 wherein the rotor bearing assembly has an inner race that extends around and contacts the drive pinion, an outer race that extends around the inner race and contacts the rotor, and a plurality of bearing elements that extend from the inner race to the outer race.

3. The axle assembly of claim 1 wherein the rotor coupling and the rotor bearing assembly are spaced apart from a differential carrier that rotatably supports a differential assembly.

4. The axle assembly of claim 1 wherein the planetary gear set is axially positioned between the rotor and the second drive pinion bearing.

5. The axle assembly of claim 1 further comprising a rotor coupling that extends around and receives the drive pinion and that is fixedly coupled to the rotor and the first gear.

6. The axle assembly of claim 5 wherein the rotor coupling extends from the rotor to the first gear.

7. The axle assembly of claim 6 wherein the rotor coupling is integrally formed with the first gear.

8. The axle assembly of claim 6 wherein the rotor coupling is partially received inside the first gear.

9. The axle assembly of claim 8 wherein the first gear has a mounting ring that extends around the first axis and that extends in an axial direction toward the rotor, wherein the rotor coupling is received inside the mounting ring.

10. The axle assembly of claim 9 wherein the rotor coupling has a rotor coupling spline that faces away from the first axis, the mounting ring has a mounting ring spline that extends toward the first axis and extends from a first side of the first gear, and the rotor coupling spline meshes with the mounting ring spline to inhibit rotation of the rotor coupling with respect to the first gear.

11. The axle assembly of claim 6 wherein the rotor coupling receives a portion of the first gear.

12. The axle assembly of claim 11 wherein the first gear has a mounting ring that extends around the first axis and that extends in an axial direction toward the rotor, wherein the mounting ring is received inside the rotor coupling.

13. The axle assembly of claim 12 wherein the rotor coupling has a rotor coupling spline that extends toward the first axis, the mounting ring has a mounting ring spline that faces away from the first axis and extends from a first side of the first gear, and the rotor coupling spline meshes with the mounting ring spline to inhibit rotation of the rotor coupling with respect to the first gear.

14. An axle assembly comprising:
   an electric motor module having a rotor that is rotatable about a first axis;
   a drive pinion that extends through the rotor and is rotatable about the first axis;
   a rotor bearing assembly that rotatably supports the rotor on the drive pinion, wherein the rotor bearing assembly extends from the drive pinion to the rotor;
   a gear reduction module that has a planetary gear set that includes a first gear that is operatively connected to the rotor, a planetary ring gear, a planet gear that meshes with the first gear and the planetary ring gear, and a planet gear carrier that rotatably supports the planet gear and is fixedly coupled to the drive pinion; and
   a rotor coupling that extends around and receives the drive pinion and that is fixedly coupled to the rotor and the first gear.

15. The axle assembly of claim 14 further comprising a first drive pinion bearing and a second drive pinion bearing that rotatably support the drive pinion, wherein the rotor and the planetary gear set are axially positioned between the first drive pinion bearing and the second drive pinion bearing.

16. The axle assembly of claim 14 further comprising a second rotor bearing assembly that rotatably supports the rotor on the drive pinion.

17. The axle assembly of claim 16 wherein the rotor coupling, the rotor bearing assembly, and the second rotor bearing assembly are spaced apart from a differential carrier that rotatably supports a differential assembly.

18. The axle assembly of claim 16 further comprising a spacer that is received inside the rotor and that extends from an inner race of the rotor bearing assembly to an inner race of the second rotor bearing assembly.

19. An axle assembly comprising:
 an electric motor module having a rotor that is rotatable about a first axis;
 a drive pinion that extends through the rotor and is rotatable about the first axis;
 a rotor bearing assembly that rotatably supports the rotor on the drive pinion, wherein the rotor bearing assembly extends from the drive pinion to the rotor;
 a gear reduction module that has a planetary gear set that includes a first gear that is operatively connected to the rotor, a planetary ring gear, a planet gear that meshes with the first gear and the planetary ring gear, and a planet gear carrier that rotatably supports the planet gear and is fixedly coupled to the drive pinion; and
 a rotor coupling that extends around and receives the drive pinion and that is fixedly coupled to the rotor and the first gear, wherein the rotor coupling extends from the rotor to the first gear.

20. The axle assembly of claim 19 wherein the rotor coupling receives a portion of the first gear.

* * * * *